Aug. 14, 1956

L. LARSSON 2,758,841

ARRANGEMENT FOR CHOPPING THE STRAW
FROM A HARVESTER-THRESHER

Filed May 4, 1953

2 Sheets-Sheet 1

Lars Larsson
INVENTOR.

BY
Pierce, Scheffler & Parker
Attorneys.

Aug. 14, 1956

L. LARSSON 2,758,841

ARRANGEMENT FOR CHOPPING THE STRAW FROM A HARVESTER-THRESHER

Filed May 4, 1953

2 Sheets-Sheet 2

Lars Larsson
INVENTOR.

BY Pierce, Scheffler & Parker
Attorneys

United States Patent Office 2,758,841
Patented Aug. 14, 1956

2,758,841

ARRANGEMENT FOR CHOPPING THE STRAW FROM A HARVESTER-THRESHER

Lars Larsson, Morgongava, Sweden, assignor to Aktiebolaget Westerasmaskiner, Morgongava, Sweden, a corporation of Sweden Application May 4, 1953, Serial No. 352,933

Claims priority, application Sweden May 8, 1952

2 Claims. (Cl. 275—3)

The present invention relates to improvements in arrangements for chopping the straw from a harvester-thresher having the straw discharge outlet at its rear end.

It is the general object of the present invention to arrange the chopping device in such a manner that the chopped straw will be thrown out at the side of the harvester-thresher and further to make it possible to provide such a guiding device for the chopped straw that the latter is evenly spread over the ground in order to facilitate the uniform ploughing of the straw into the ground.

The invention is more particularly described below with reference to one form of construction shown in the accompanying drawing by way of example.

Figure 1:
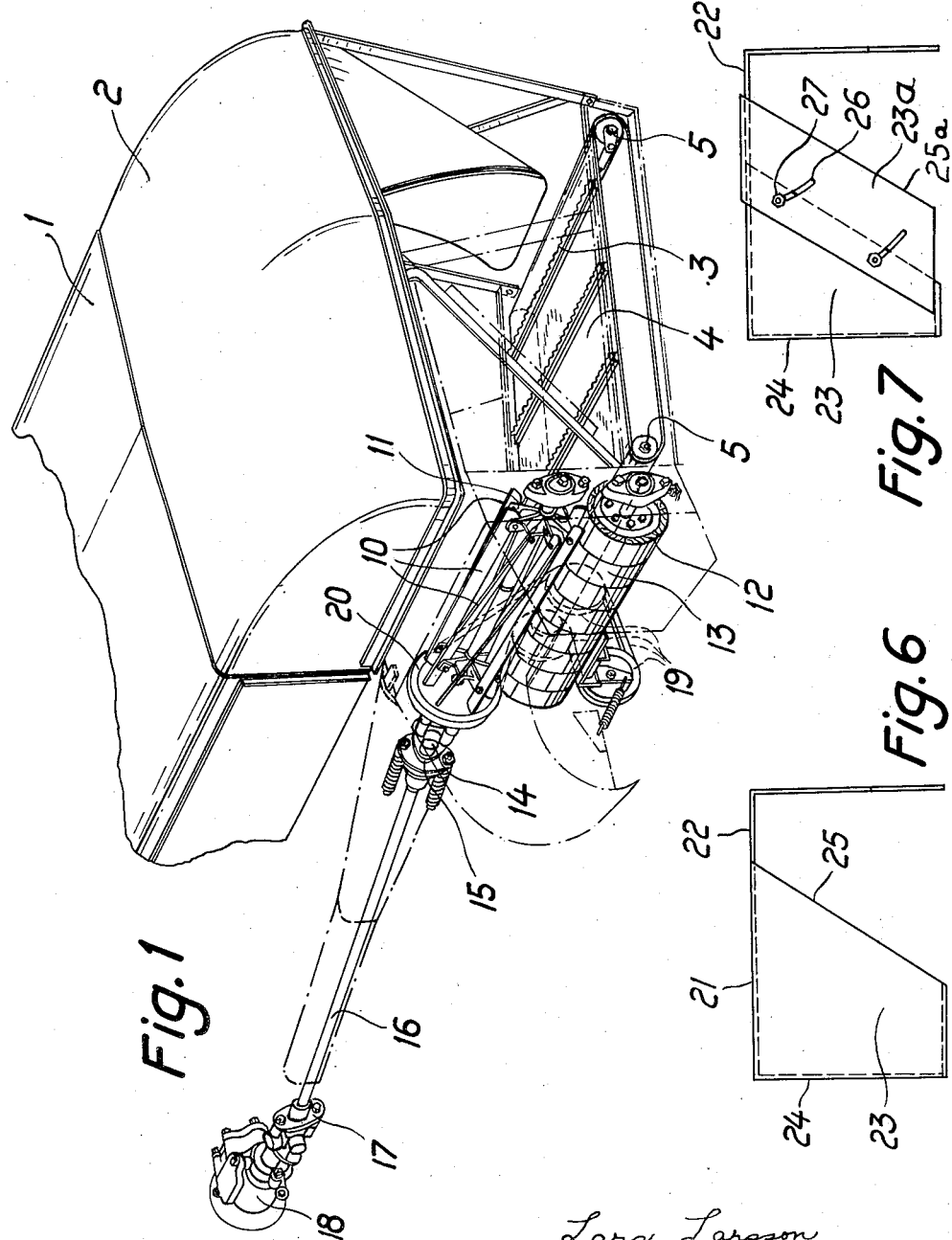
Figure 2:
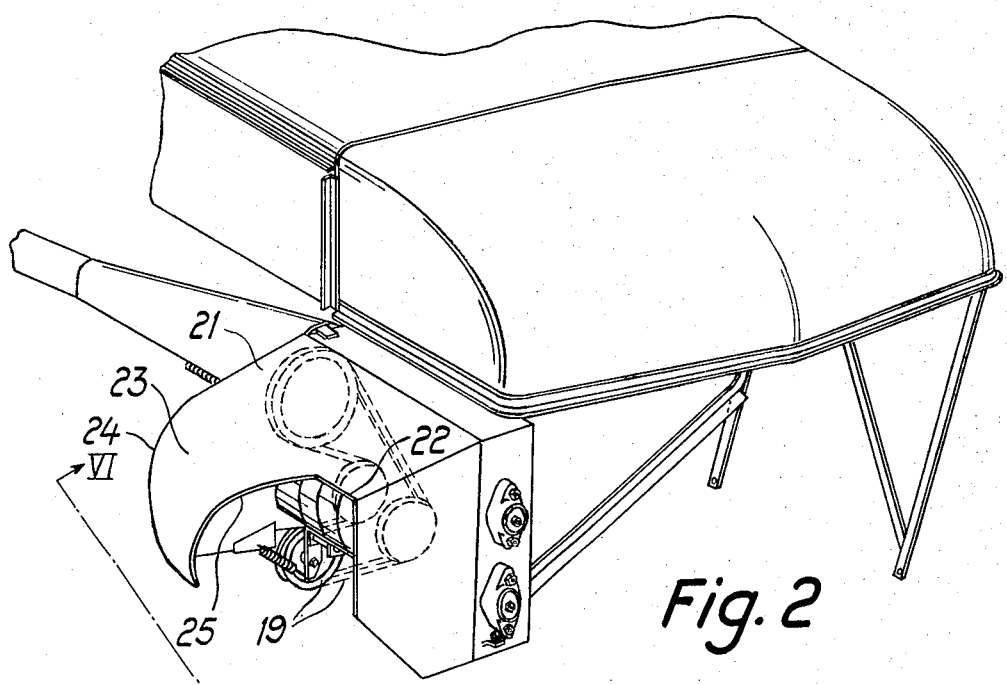
Figure 3:
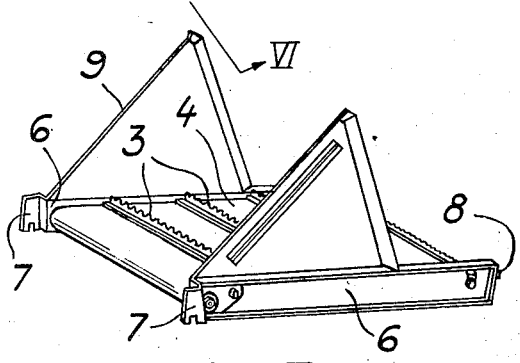
Figure 5:
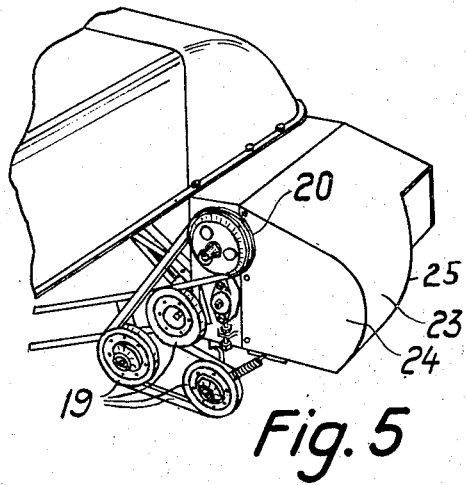
Figure 4:
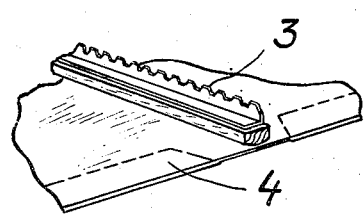

Fig. 1 of the drawing illustrates the back part of a harvester-thresher equipped with an arrangement according to the invention, viewed at an angle from the rear, and with the chopping members and their protective housing in perspective, the housing being assumed to be transparent. Fig. 2 shows an arrangement from the same direction as in Fig. 1 but with the transverse conveyor removed. Fig. 3 shows the transverse conveyor in perspective. Fig. 4 is a detail view of a transverse conveyor. Fig. 5 shows the arrangement viewed at an angle from the front relatively to the harvester-thresher. Fig. 6 is a view looking in the direction of line VI—VI of Fig. 2 and showing the housing enclosing the chopping device; and Fig. 7 is a view similar to Fig. 6 but showing a modification permitting an adjustment of the angle formed between the back edge of the housing and a plane transverse to the longitudinal direction of the machine.

In Fig. 1 of the drawing 1 is the upper casing of the harvester-thresher extending rearwardly of the thresher, with the straw discharge outlet, the longitudinal axis of the casing being parallel with the direction of movement of the thresher. An arc-shaped hood is indicated at 2, which guides the straw leaving the discharge opening, downwards in a known manner. Below the hood 2 a transverse conveyor is arranged in the form of an endless belt 4 provided with lateral drivers 3, the rollers for which are mounted in a frame 6 (Fig. 3). The frame is fitted with members such as hooks 7 or journals 8 by means of which it can be suspended in corresponding members mounted on the thresher so that it can be conveniently detached and placed in position. In the suspended position the conveyor is preferably slightly inclined in an upward direction towards its discharge end.

Side walls 9 for the conveyor are fixed to the sides of the frame 6.

Immediately in front of the conveyor's discharge end rotary chopping members for the straw are mounted in parts connected to the framework of the thresher, and consist of a cutter reel 11 fitted with longitudinally arranged knives 10 and a counter-roller 12 provided with a wear-preventing device 13 of, for example, wood, synthetic resin or the like, the knives 10 cooperating with the wear surface 13 to cut the straw as the latter is fed longitudinally of itself through and transverse to the axis of rotation of the cutter reel 11 and counter-roller 12.

The cutter reel 11 is arranged approximately vertically above the counter-roller and is directly driven, through a universal joint 14 and an overload coupling 15 of a type known per se, from a shaft 16 running in the longitudinal direction of the thresher, the said shaft starting from a gearbox 18 and passing over a second universal joint 17. The ingoing shaft of the gearbox may be driven, for example, from the main driving shaft of the machine or from the running wheels.

One shaft 5 of the conveyor 4 is driven through a belt transmission 19 from a V-belt pulley 20 mounted on the shaft of the knife roller.

Due to the action of the conventional straw rack (not shown) within casing 1, which reciprocates longitudinally of the casing 1, and serves to align the straw transversely of the casing as it advances through the same, the straw issues from the discharge outlet of the harvester-thresher substantially transversely, that is to say, it is mainly directed towards the direction of movement of the conveyor 4, and will then be fed along chiefly in a longitudinal direction between the cutter reel 11 and roller 12. In this way the straw is chopped into the smallest possible pieces. In order to improve the parallelism between the straws, the drivers 3 are suitably toothed in the lateral direction of the conveyor, as may be clearly seen from Fig. 4.

A housing is indicated at 21 having front, rear, top and side walls which covers the cutter reel 11 and roller 12 at the top and also at the front and the back relatively to the harvester-thresher's direction of travel. As may best be seen from Fig. 2, the housing 21 is open on the side turned away from the thresher at 22 along a rear part of its length. The straw is thrown straight out here by the rapidly rotating parts 11 and 12 in a direction transverse to the direction of travel of the thresher. To obtain more even spreading of the chopped straw over the ground, the housing 21 is provided along a part of its length with an external side wall 23 bent outward and downward in the form of an arc, the length of which, reckoned in the direction of travel, decreases from the top downwards so that the back edge 25 of the side wall 23 will thus form an angle with the edge of the front wall 24 of the housing, which wall is situated in a substantially vertical plane transverse to the longitudinal direction of said machine, so that the cut-away portion of the housing 21 increases from the top to the bottom of the housing. In this way the chopped straw thrown out from the part of the chopping members 11, 12 located nearest to the edge of front wall 24 is guided back underneath the roller 12, whereas the chopped straw nearer the back edge 25 is thrown straight down and, to a progressively increasing extent, laterally outward from the harvester-thresher. Fig. 7 shows a modified construction wherein the spreading can be adjusted owing to the fact that the back edge of the wall 23 comprises a fixed wall portion and an adjustable wall portion in the form of an adjustable plate 23a with oblong slots 26 through which fixing screws 27 mounted on the wall 23 pass. The plate 23a can thus be adjusted in such a way that the edge of front wall 24 and back edge 25a form a larger or smaller angle with one another so that the back edge 25a of the plate 23a can form the desired angle with a vertical plane transverse to the longitudinal direction of the harvester-thresher machine.

What I claim is:

1. In a harvester-thresher machine, the combination comprising a straw casing extending rearwardly in the longitudinal direction of the machine and longitudinally of its direction of travel, the straw being fed through said casing to an outlet at the rear end thereof, a conveyor arranged below said outlet transverse to the longitudinal axis of said casing whereby the straw will be delivered to and moved along said conveyor, a chopping device at the discharge end of said conveyor comprising a rotary cutter reel having knives extending longitudinally thereon and transversely to said conveyor, a housing having front, rear, top and side walls surrounding said chopping device at the top, front, rear and side thereof and being cut away along a rear part of its side wall so as to leave a straw ejection outlet opening in a direction laterally outward from the longitudinal axis of said machine and said straw casing, the side wall of said casing being curved convexly downward, the front edge of said side wall being in a substantially vertical plane and the back edge of said side wall forming an angle with said front edge such that the cut-away portion of said housing increases from the top to the bottom thereof whereby chopped straw thrown out by said chopping device located nearest the front edge of said housing side wall is guided back underneath said chopping device whereas chopped straw nearer said back edge of said housing side wall will be thrown straight down and to a progressively increasing extent laterally outward from said machine.

2. A harvester-thresher machine as defined in claim 1 wherein the rear portion of the curved side wall of said housing including the back edge thereof is formed by a plate, said plate being adjustable such that the angle formed between said back edge and a vertical plane transverse to the longitudinal direction of said machine can be varied.

References Cited in the file of this patent
UNITED STATES PATENTS

| | | |
|---|---|---|
| 408,221 | Davis | Aug. 6, 1889 |
| 1,324,147 | Elmer | Dec. 9, 1919 |
| 1,435,766 | Varland | Nov. 14, 1922 |
| 1,558,502 | Power | Oct. 27, 1925 |
| 2,327,893 | Hobson | Aug. 24, 1943 |
| 2,430,020 | Johnson | Nov. 4, 1947 |
| 2,563,418 | Peter et al. | Aug. 7, 1951 |
| 2,611,407 | Alloway | Sept. 23, 1952 |

FOREIGN PATENTS

| | | |
|---|---|---|
| 584,809 | Great Britain | Jan. 23, 1947 |